United States Patent [19]

Simonis et al.

[11] 4,378,732
[45] Apr. 5, 1983

[54] TYING APPARATUS FOR AGRICULTURAL ROLL BALERS

[75] Inventors: Jürgen Simonis; Hans-Otto Sacht, both of Wolfenbüttel, Fed. Rep. of Germany

[73] Assignee: Gebrüder Welger GmbH & Co. Kommanditgesellschaft, Wolfenbüttel, Fed. Rep. of Germany

[21] Appl. No.: 235,643

[22] Filed: Feb. 18, 1981

[30] Foreign Application Priority Data

Nov. 8, 1980 [DE] Fed. Rep. of Germany ....... 3042254

[51] Int. Cl.³ .......................................... B65B 13/18
[52] U.S. Cl. .......................................... 100/5; 100/13
[58] Field of Search ................. 100/5, 13, 88; 56/341, 56/343

[56] References Cited

U.S. PATENT DOCUMENTS 2,468,641  4/1949  Scranton et al. ................ 100/5
2,826,985  3/1958  Harrer ........................ 100/88 X

FOREIGN PATENT DOCUMENTS 2640563  3/1978  Fed. Rep. of Germany ........ 100/5
3007646  2/1980  Fed. Rep. of Germany ........ 100/5

Primary Examiner—Billy J. Wilhite
Attorney, Agent, or Firm—Toren, McGeady & Stanger

[57] ABSTRACT

Apparatus for forming roll bales of agricultural harvest material operating to helically tie the roll bales with twine is provided with a twine guide member moving along a front intake aperture of the baler and automatically controlled by a ratchet and pawl mechanism. The guide member is biased toward a lateral rest position by a spring. An actuating line is attached to the guide member to enable the guide member to be moved to an opposite lateral start position against the force of the spring. The actuating line is wound around a pulley of the ratchet and pawl mechanism. The ratchet and pawl mechanism includes a releasing disc which is driven by the twine itself during a tying operation and which carries a lifting cam which alternately disengages a pair of pawls of the ratchet and pawl mechanism. The guide member is first pulled by the actuating line into its start position and the spring will subsequently draw the guide member back toward its rest position with the return motion being controlled by the ratchet and pawl mechanism.

17 Claims, 6 Drawing Figures

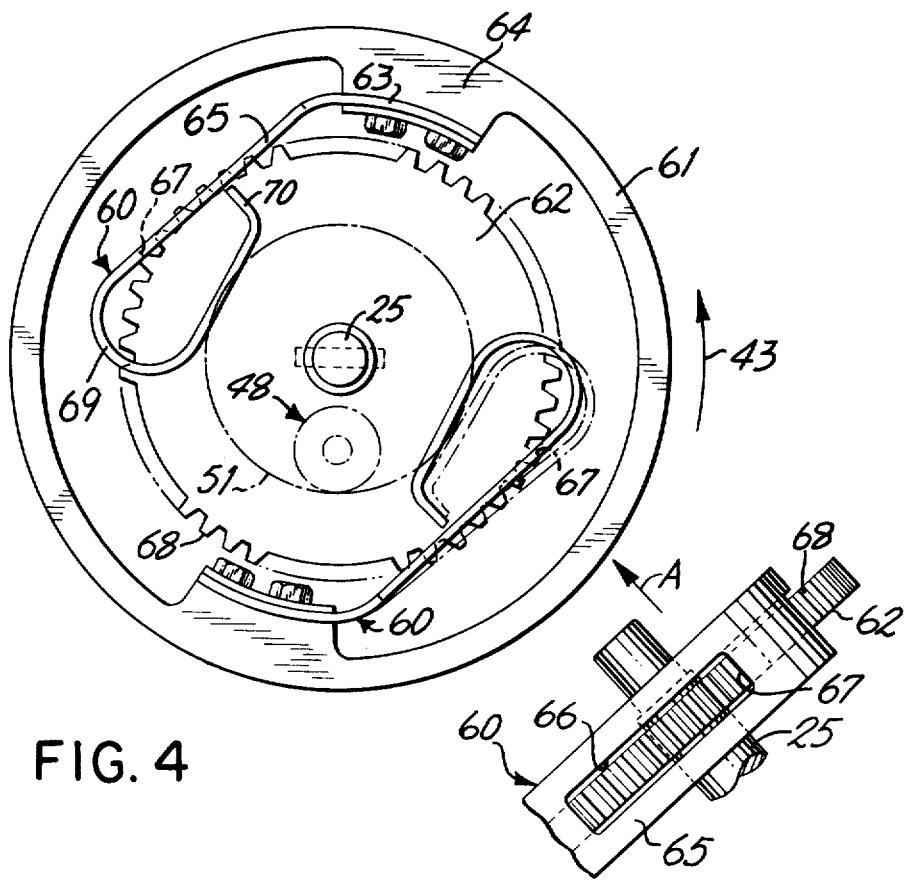
FIG. 4
FIG. 5
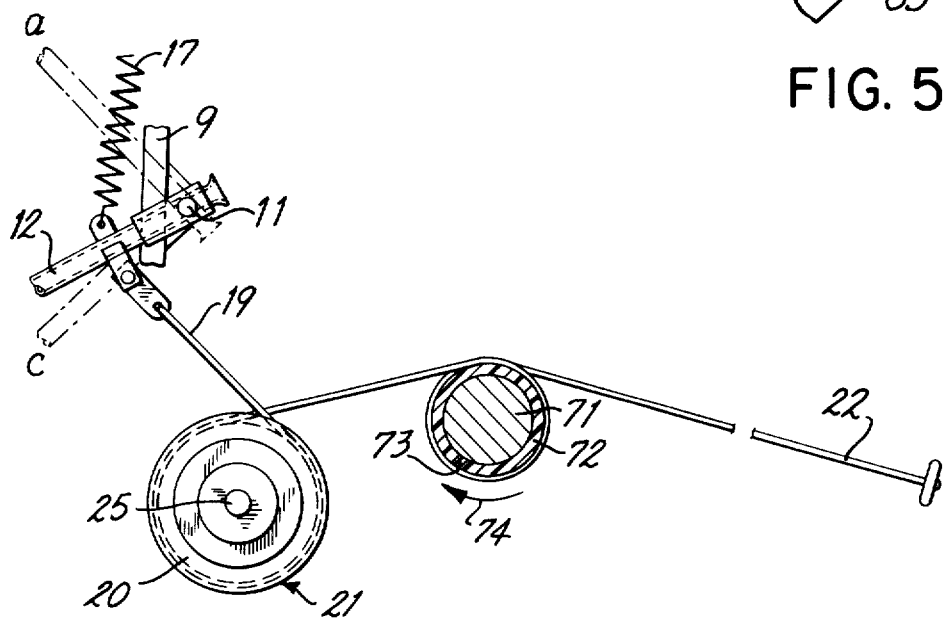
FIG. 6

TYING APPARATUS FOR AGRICULTURAL ROLL BALERS

BACKGROUND OF THE INVENTION

The present invention relates generally to agricultural equipment and, more particularly, to an apparatus for controlling the helically tying by means of twine of agricultural roll bales formed in a roll baler device. In apparatus of the type to which the present invention relates, a guide member is provided for guiding twine along an intake aperture extending across the width of a bale chamber housing of the roll baler and spring means operate to pull the guide member into a lateral rest position, with the spring means being tensioned by movement of the guide member into its opposite start position with a control device automatically controlling the rate of feed of the guide member during tying operation.

In apparatus of the type to which the present invention relates known, for example, from German Pat. No. 30 07 646, the rate of feed is controlled by a cam gear. When a cam disc of the device is correctly designed for a desired tying sequence, there may result kinematically unfavorable transmission angles which lead to substantial wear particularly due to unavoidable dust in the atmosphere. The substantial speed step-down which is necessary will require complicated construction and numerous bearings and joints which will require maintenance. Additionally, the cam disc must positively transmit feed motion to the guide member against the force of a spring and against countertorque exerted by tension in the twine, and when this occurs very high transmission forces are required. In this connection, reference is made to German Offenlegungsschrift No. 26 40 563 and U.S. Pat. No. 2,468,641.

Additionally, an operator may no longer be able to influence the tying procedure during its sequence in these cases. For example, it may be desirable or necessary after commencement of the helical tying operation to apply new initial windings and to commence tying once again.

The invention is directed toward the task of providing a tying apparatus which is essentially automatically controlled and which is structurally uncomplicated, small in its dimensions, low in wear and maintenance, and relatively inexpensive. The invention is further intended to provide a mechanism wherein commencement of operation will occur with substantial safety and wherein spacings of windings which are developed will be very uniform, even when the properties of the materials may differ.

SUMMARY OF THE INVENTION

Briefly, the present invention may be described as an agricultural roll baler including a tying apparatus for helically tying with twine roll bales of agricultural crop material formed in a bale chamber housing having an intake aperture extending across the width thereof. The tying apparatus comprises a guide member for guiding the twine along the intake aperture, spring means biasing the guide member toward a lateral rest position, the spring means being tensioned by movement of the guide member into a start position opposite the rest position and control means for controlling the rate of feed of the guide member during tying.

In accordance with the present invention, the control means comprises a ratchet and pawl mechanism operating to hold the guide member in position against the force of the spring means and to release the guide member from movement toward the rest position under the force of the spring means. This enables a step-down of the drive of any magnitude of the cross feed motion of the guide member resulting in a uniform rate of feed with a device which is simple in construction and low in maintenance requirements. The control device is not required to apply driving force to the guide member but operates only to absorb the force of the spring means. The countertorque applied in the final phase of the tying operation by the tension of the twine on the laterally directed guide member also does not result in a drive load on the control device. Furthermore, the tying operation may be started in an especially easy manner at any desired moment and it may be interrupted at any desired position.

This mode of operation is facilitated by forming the ratchet and pawl mechanism with a pulley around which there is wound an actuating line which is fastened to the guide member and by means of which the guide member may be pulled to the start position of its operating cycle. By pulling at the end of the actuating line the pulley rotates in its free direction of rotation and the guide member is moved into its start position or can be stopped in any intermediate position. When the tension on the end of the actuating line is eased or released the spring means tend to move the guide member toward its rest position and to rotate the pulley in reverse direction of rotation. However, in this direction of rotation the pulley is locked by the ratchet and pawl mechanism releasing the guide member in a step-by-step manner thereby controlling the rate of feed of the guide member during its tying operation.

In a preferred embodiment of the invention, the ratchet and pawl mechanism includes a ratchet wheel which is affixed with the pulley, with the ratchet wheel interacting with at least two pawls acting in the same direction and supported on a frame wherein the pawls are alternately in engagement with one pawl engaging when the other pawl is lifted out of engagement after rotation of the pulley, with a releasing disc being provided arranged coaxially relative to the pulley, the releasing disc carrying a lifting cam which operates to alternately move the two pawls out of engagement with the ratchet wheel as the releasing disc rotates.

For a kinematic reversal, the ratchet wheel may be also arranged fixedly on the frame and the pawls may be supported on a pulley. In accordance with the invention, the pawls are either pretensioned on a rubber spring wherein additionally good damping of the tangential impacts derived may be achieved or they may be constructed as rigidly arranged leaf springs. In an embodiment of the latter type particularly small structural dimensions may be realized.

The releasing disc may be provided with one or more different grooves around which the tying twine is wound as it is guided from the twine supply box to the guide member. In this case, the twine will drive the releasing disc from the commencement of the typing operation. However, the start of the pulley will be independent therefrom and occurs only when the end of the actuating line is released. The twine is not required to transmit any significant forces. As a result, the solution of the present invention will be found to differ in principle from known proposals such as those set forth, for example, in German Pat. No. 26 40 563 and U.S. Pat.

No. 2,468,641 wherein the tying sequence begins positively with the intake of the twine and wherein delay, shift, or interruption are not possible. Furthermore, there are avoided known disadvantages which arise by virtue of the fact that the force of the frictional engagement of the twine is too low to allow starting of the control device or due to the fact that the intake of the twine by the roll bale is hindered or prevented when the releasing disc applies high tensional forces on the twine.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 4 is a plan view of a second embodiment of a ratchet and pawl mechanism with parts removed;

FIG. 5 is a partial view of the ratchet and pawl mechanism shown in FIG. 4 as viewed in the direction of the arrow A; and FIG. 6 is a schematic representation of an auxiliary device for facilitating actuation of the twine guide arm of the invention.

In the description which follows, the terms "right" and "left" are used with respect to the sides of the mechanism as they are seen taken in the direction of travel of the baler.

DETAILED DESCRIPTION OF THE PREFERRED EMBODIMENTS

Figure 1:
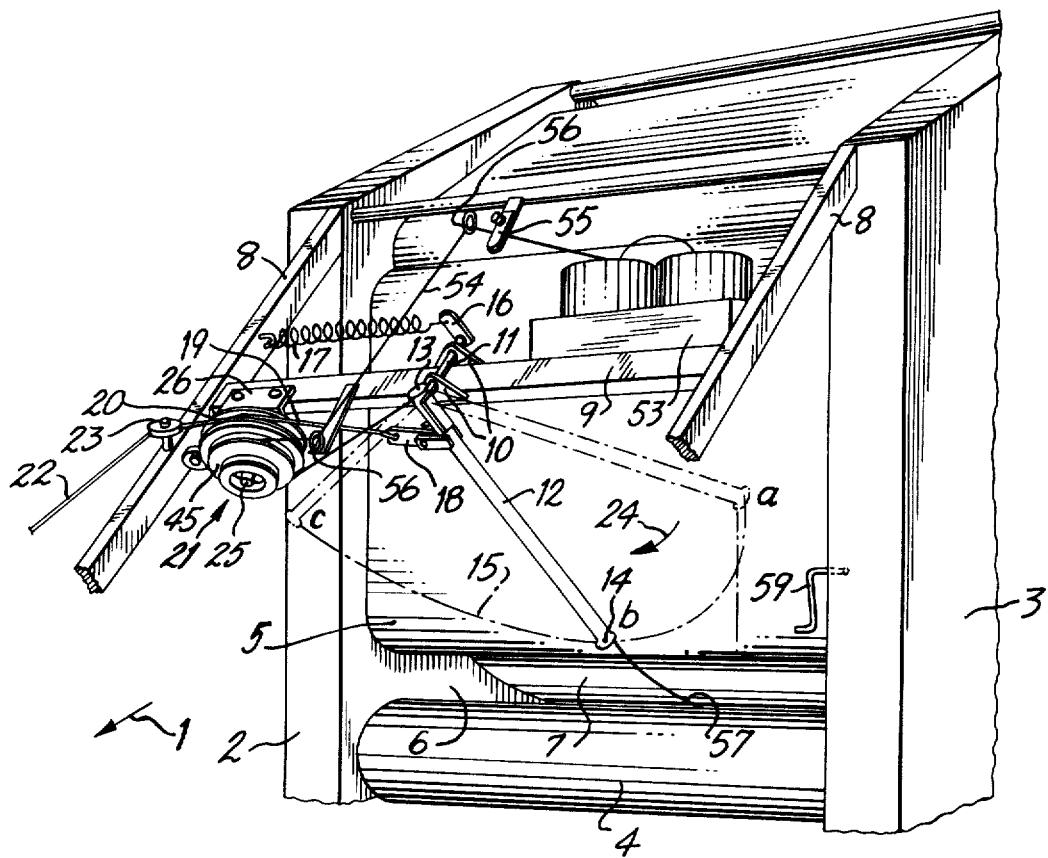
FIG. 1 is a perspective partial view of a roll baler having a tying arrangement in accordance with the present invention.

Referring now to the drawings, wherein similar parts are identified with like reference characters throughout the various figures thereof, a roll baler in accordance with the present invention is depicted in FIG. 1 as comprising a bale chamber housing which is formed by a pair of sidewalls 2 and 3 between which there are supported a conveying bottom 4 and an upper rotating pressing device 5 which are drivable in the same directions of rotation. An intake aperture 6 is formed in the front part of the baler between the conveying bottom 4 and the pressing device 5 and agricultural material which is to be formed in a roll bale is conveyed through the intake aperture 6 from a collecting drum (not shown) into the bale chamber of the mechanism where it is formed into a roll bale 7.

The bale chamber housing is formed with two forwardly directed support members 8 having a transverse support member 9 arranged therebetween. A shaft 11 is supported in a pair of bearing lugs 10 on the transverse support member 9 at approximately the center thereof. The shaft 11 carries at one end thereof a pivotable twine guide arm 12.

The guide arm 12 is constructed in tubular form and includes a twine inlet opening 13 which is located near the shaft 11 with a twine guide outlet opening 14 being located at the opposite end of the guide arm 12. When the guide arm 12 is pivoted in the arched path indicated by the line 15, the twine is guided by the guide opening 14 to be moved in front of and along the intake aperture 6.

At the end thereof opposite the end connected with the arm 12, the shaft 11 carries an arm 16 which is connected through a tension spring 17 with the bale chamber housing in such a manner that the tension spring 17 applies a spring biasing force to pull the twine guide arm 12 toward a first position a located at the left side of the baler (the right side of FIG. 1) which may be designated as a position of rest for the guide arm 12.

A connecting member 18 is attached in an articulated manner to the twine guide arm 12 at a point slightly below the shaft 11 and an actuating line 19 is fastened to the connecting member 18. The line 19 extends approximately horizontally in the plane of movement of the twine guide arm 12 toward the right of the baler (to the left as viewed in FIG. 1) with the line 19 extending to a pulley 20 of a ratchet and pawl mechanism to be described in more detail hereinafter. The actuating line 19 is wound around the pulley 20 and extends from the pulley 20 over a guide roller 23 which is supported upon the support member 8, the line 19 extending in the forward direction 1 of the baler to a work range of an operator of the mechanism. The twine guide arm 12 may be moved in the direction of the arrow 24 from the left side to the right side of the baler (the right side to the left side of FIG. 1) by pulling of the end 22 of the actuating line 19 and as a result of such pulling action, the tension spring 17 will be stretched or tensioned thereby applying a spring biasing force tending to urge the guide arm 12 back to the first position a or its position of rest.

Figure 3:
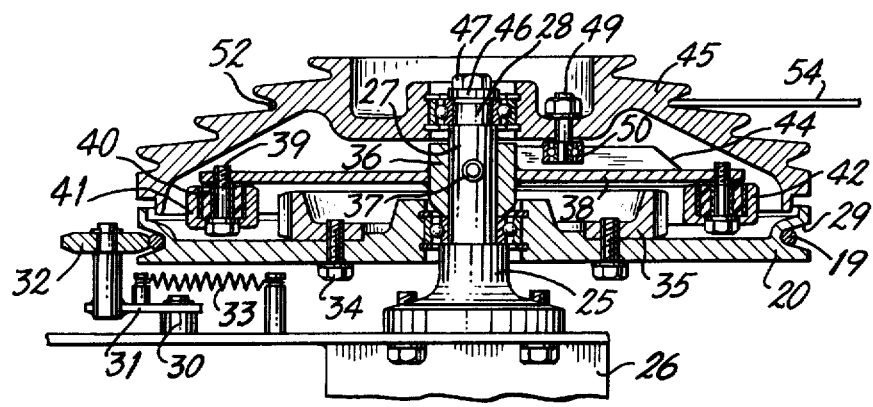
FIG. 3 is a sectional view of the ratchet and pawl mechanism of the invention.
Figure 2:
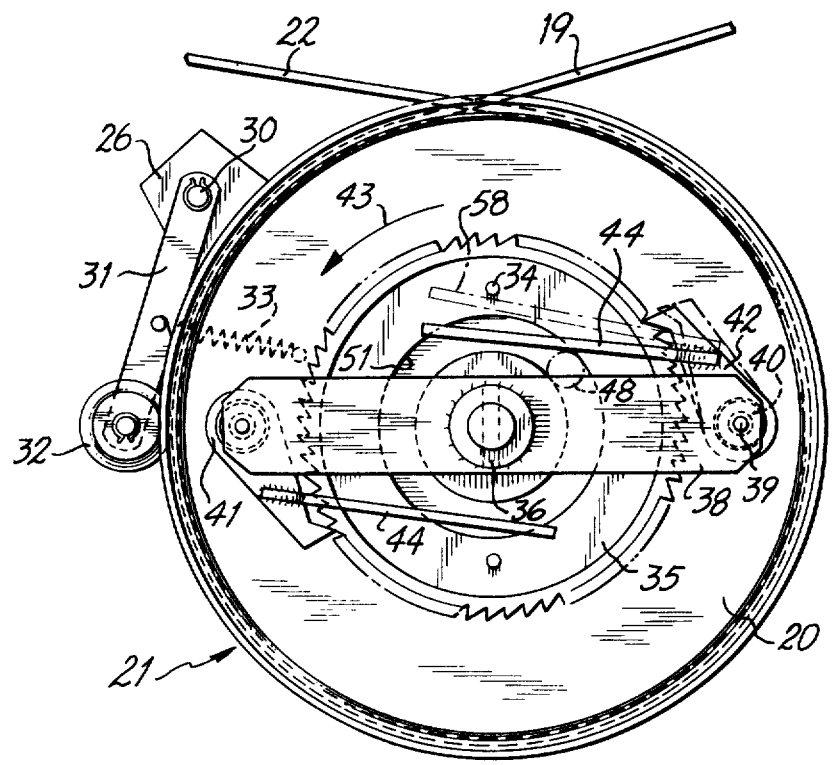
FIG. 2 is a plan view of a ratchet and pawl mechanism of the invention with parts removed.

The ratchet and pawl mechanism 21 is arranged to the right of the baler adjacent the shaft 11. The mechanism 21 has a bearing pin 25 which is fastened on the transverse support member 9 by means of an angular bracket 26, with the pin 25 being aligned approximately perpendicularly relative to the plane of movement of the twine guide arm 12. The bearing pin 25 is formed with two reduced diameter portions 27 and 28 and three elements of the ratchet and pawl mechanism to be further described hereinafter are supported on the reduced diameter portions 27 and 28, as best seen in FIGS. 2 and 3.

The pulley 20 is rotatably supported on the first reduced diameter portion 27. A circumferential groove 29 for receiving the actuating line 19 is formed on the outer edge of the pulley 20. A swinging lever 31 supported at the bracket 26 on a pin 30 carries a pressure roller 32 having a profile which is selected in such a manner that it will press the actuating line 19 into the circumferential groove 29 under the action of a tension spring 33 stretched between the swinging lever 31 and the bracket 26 in order to increase the force of frictional engagement between the line 19 and the pulley 20 and also to prevent the line 19 from slipping.

A ratchet wheel 35 having an odd number of teeth is fastened by means of screws 34 to the inside of the pulley 20. An even number of teeth may alternatively be provided.

A hub 36 located above the ratchet wheel 35 is carried on the first reduced diameter portion 27 and is secured against rotation relative thereto by means of a sleeve 37. A carrier plate 38 which extends beyond the outer diameter of the ratchet wheel 35 to opposite sides thereof is fastened on the hub 36. A pair of pawls 41 and 42 are pivotally supported by means of screws 39 and rubber springs 40 at the ends of the carrier plate 38 outside of the diameter of the ratchet wheel with the arrangement being such that a connecting line extending between the pivot axes of the pawls 41, 42 will extend through the center of the ratchet wheel 35. Each of the pawls 41, 42 is mounted under an initial tension in such a way that the lip of each of the pawls will press against the teeth of the ratchet wheel 35. Both pawls 41 and 42 are arranged so as to rotatively lock the ratchet wheel in the same direction of rotation. The pawls will thereby lock the rotary motion of the pulley 20 against rotation in the direction of the arrow 43. An actuating lever 44 is welded to the upper side of each of the pawls 41 and 42 extending laterally at a distance from the bearing pin 25.

A releasing disc 45 is freely rotatably supported on the second reduced diameter portion 28 of the bearing pin 25, with the disc 45 being fixed against movement in the axial direction by means of a washer 46 and a screw or bolt 47. At the bottom side of the releasing disc 45 there is arranged a lifting cam 48 located eccentrically relative to the axis of rotation of the disc 45, the lifting cam 48 consisting of a roller 50 supported upon a pin 49.

During rotation of the releasing disc 45, the lifting cam 48 will describe a circular path 51 which coincides with the actuating levers 44 so that the pawls 41 and 42 will be alternately lifted from engagement with the ratchet wheel 35 during rotation of the releasing disc 45.

The actuating levers 44 project with their free ends beyond the circular path 51 so that the releasing disc 45 may be operated in both directions of rotation. Because of the long lifting distance of the lifting cam 48, the drive torque to be applied by the releasing disc 45 is maintained at a relatively low level.

A plurality of grooves 52 having different diameters are arranged on the outer rim of the releasing disc 45.

Twine 54 is guided from a twine supply box 53 over a twine brake 55 and through eyes 56 to the releasing disc 45, with the twine 54 being wound around the disc 45 in one of the grooves 52 thereof. From there, the twine extends through the tubular twine guide arm 12 and, in the position of rest a (FIG. 1) of the twine guide arm 12, the free end 57 of the twine will hang loosely from the guide opening 14.

When a completely formed roll bale 7 is to be tied with twine, the twine guide arm 12, shortly prior to termination of the material supply, is swung by pulling at the end 22 of the actuating line 19 into a middle position b (FIG. 1) against the force of the tension spring 17 and the arm will be temporarily held in this position. During this swinging motion, the pulley 20 will rotate in the direction of the arrow 43 and the pawls 41 and 42 will slide along the flanks of the teeth of the ratchet wheel 35.

In the middle position of the twine guide arm 12, the guide opening 14 will be located closely adjacent the intake aperture 6 so that the free end 57 of the twine will be grasped by the material which has been supplied last to the roll bale 7 and the twine will be taken along by the rotating roll bale 7. In so doing, the twine 54 will be pulled through the twine guide arm 12 and the releasing disc 45 around which the twine 54 is wound is rotated. By the rotation of the releasing disc 45, the lifting cam 48 will alternatively lift the unloaded pawls 41 and 42. However, the pulley 20 will not be actuated because it is held by the end 22 of the actuating line 19.

By further pulling at the end 22 of the actuating line 19, the guide arm 12 may be swiftly swung into its start position c (FIG. 1) which is fixed by stop means (not shown). In the position c, the twine guide arm 12 is also temporarily fixed by the pull at the end 22 of the actuating line 19 in order to apply parallel initial windings on the end face of the roll bale 7. The number and the position of the initial parallel windings of twine to be formed on the roll bale 7 may be freely selected by the operator.

The helical tying procedure will begin only when the operator eases or releases the tension on the end 22 of the actuating line 19. When this occurs, the tension spring 17 will tend to pull the twine guide arm 12 toward its first position a or its position of rest and the pulley 20 will be rotated against the direction of rotation of the arrow 43. However, this rotation is prevented by the pawls 41 and 42 which are now active and the lip of the pawl 42 will engage the teeth of the ratchet wheel 35 thereby locking the ratchet wheel 35 against rotary motion. The releasing disc 45 is driven by the incoming twine 54, thereby running the lifting cam 48 against the actuating lever 44 lifting the pawl 42 into a postion 58, which is illustrated in FIG. 2 by dash-dot lines, whereby rotary motion of the pulley 20 is effected which is interrupted by the engagement of the other pawl 41. When the releasing disc 45 is further rotated, the pawl 41 will be lifted out of engagement with the ratchet wheel 35 until the pawl 42 again interrupts the rotary motion of the pulley 20. In this manner, the pawls 41 and 42 are alternately lifted during continuous rotation of the releasing disc 45 whereby the pulley 20 will release in a step-by-step manner the twine guide arm 12 against the tension spring 17 thereby controlling its backward swinging motion with a uniform rate of feed. The magnitude of the winding spaces may be selected by use of different grooves 52.

The twine guide arm 12 may be stopped at any time and at any location during its backward swinging motion from the location c to the location a and it may also be pulled back to its starting position c.

During operation of the device, the twine will run against a spacer 59 at about two to three bale rotations prior to reaching the position of rest a and thus the roll bale will receive several parallel final windings. When the twine guide arm 12 returns to its original position a, also referred to herein as the position of rest or the first position of the guide arm, the twine 54 will be severed by means of a cutting device (not shown) and the tying procedure will thereby be concluded.

A second embodiment of the ratchet and pawl mechanism of the invention is illustrated in FIGS. 4 and 5. In this embodiment, in a kinematic reversal, the pawls 60 are supported on a pulley 61 while a ratchet wheel 62 is fixedly mounted on the bearing pin 25. The pawls 60 are constructed as leaf springs. A first portion 63 of the leaf springs is curved and it is attached by screws into a projection 64 of the pulley 61. A second straight portion 65 extends along the rim of the ratchet wheel 62. In this region, an oblong hole or recess 66 is arranged having a width which is slightly greater than the width of the rim of the ratchet wheel. An edge 67 serves as a stop for trapezoidal teeth 68 of the ratchet wheel 62. The leaf spring is formed with an initial tension such that the edge 67 is pressed against the teeth 68. A third portion 69 of the leaf spring extends only on the side of the releasing disc 45 and it is bent into a circle of rotation 51 of the lifting cam 48. This third portion 69 extends on both sides beyond the circle of rotation 51. Its end 70 is supported on the second portion 65 for stiffening purposes.

FIG. 6 depicts an auxiliary device for energy saving tensioning of the twine guide arm 12 and the tension spring 17 from the position of rest a into the start position c. After being wound around the pulley 20, the actuating line 19 is guided toward a shaft 71 which rotates during operation of the baler. A sleeve 72 made of resilient plastic material is supported on the shaft 71 surrounding the shaft 71 in such a manner that a gap 73 of the sleeve 72 is open. The line 19 is wound around the sleeve 72 with at least one complete loop in the direction of rotation 74 of the shaft 71 and it then leads to an operator with the end 22.

When the end 22 of the line is not tensioned or only slightly tensioned, the shaft 71 may freely rotate within the sleeve 72. However, when an operator pulls at the end 22 of the actuating line, the sleeve 72 will be constricted and pressed around the surface of the shaft 71 to become frictionally engaged therewith. The sleeve 72 will transmit this rotation to the line 19 which will then operate to tension the twine guide arm 12 from the position of rest a into the start position c. In order to interrupt the swinging or pivoted motion of the twine guide arm 12 in positions such as the positions b and c, it is merely necessary to reduce the tension on the end 22 of the actuating line 19. By completely slackening the end 22, return motion of the guide arm 12 controlled by the ratchet and pawl mechanism will be effected.

While specific embodiments of the invention have been shown and described in detail to illustrate the application of the inventive principles, it will be understood that the invention may be embodied otherwise without departing from such principles.

What is claimed is:

1. An apparatus for helically tying with twine roll bales of agricultural crop material formed in a bale chamber housing of a roll baler having an intake aperture extending across the width thereof comprising a guide member for guiding said twine along said intake aperture, spring means biasing said guide member toward a lateral rest position, said spring means being tensioned by movement of said guide member into a start position opposite said rest position and control means for controlling the rate of feed of said guide member during tying, said control means comprising a ratchet and pawl mechanism operating to hold said guide member in position against the force of said spring means and to release said guide member from movement toward said rest position under the force of said spring means.

2. Apparatus according to claim 1 wherein said ratchet and pawl mechanism comprises a pulley and wherein an actuating line is provided being fastened to said guide member and being wound around said pulley whereby a free end of said actuating line is operating to enable said guide member to be pulled to said start position.

3. Apparatus according to claim 2 wherein said free end of said actuating line is adapted to be manipulated by an operator.

4. Apparatus according to claim 3 wherein there is provided a shaft which is rotatively driven by operation of said baler, said actuating line being engaged to be tensioned by means of said shaft.

5. Apparatus according to claim 4 wherein a sleeve made of resilient material is arranged around said shaft, said sleeve being adapted to be resiliently frictionally engaged and disengaged with said shaft, said actuating line being wound around said sleeve with the diameter of said sleeve being reduced by pulling of said actuating line whereby said sleeve will be rotatively driven by said shaft.

6. Apparatus according to claim 2 wherein said actuating line is fixedly connected to said pulley.

7. Apparatus according to claim 2 further comprising a pressure roller pressing said actuating line against said pulley.

8. Apparatus according to claim 2 wherein said ratchet and pawl mechanism comprises a ratchet wheel fixedly connected with said pulley, at least two pawls supported on the frame of said baler and operatively interacting with said ratchet wheel, said pawls being effective to retard rotation of said ratchet wheel in the same direction, said pawls being arranged to alternately engage said ratchet wheel to retard rotation thereof with one pawl becoming engaged when the other pawl is disengaged after rotation of said pulley, and a releasing disc coaxially arranged relative to said pulley, said releasing disc including a lifting cam adapted to alternately disengage said pawls from said ratchet wheel upon rotation of said releasing disc.

9. Apparatus according to claim 8 wherein said ratchet wheel is fixedly attached on the frame of said baler and wherein said pawls are supported on said pulley.

10. Apparatus according to claim 8 wherein said ratchet wheel is formed with an even number of teeth and wherein said pawls are oppositely located and arranged offset relative to each other by a half-tooth spacing.

11. Apparatus according to claim 8 wherein said ratchet wheel is formed with an odd number of teeth and wherein said pawls are arranged diametrically opposite each other.

12. Apparatus according to claim 8 wherein said pawls are mounted pretensioned with a rubber spring.

13. Apparatus according to claim 8 wherein said pawls are constructed as fixedly mounted leaf springs.

14. Apparatus according to claim 8 wherein said releasing disc is provided with a groove around which said twine is wound by guiding said twine from a twine supply box to said guide member.

15. Apparatus according to claim 14 wherein a plurality of said grooves having different diameters are provided on said releasing disc to enable optional winding of said twine.

16. Apparatus according to claim 1 wherein said guide member is constructed as a pivoted twine guide arm.

17. Apparatus according to claim 1 wherein said guide member is constructed as a twine guide assembly moving in a rectilinear path parallel to said intake aperture.

* * * * *